United States Patent
Lotem et al.

(10) Patent No.: US 11,146,581 B2
(45) Date of Patent: Oct. 12, 2021

(54) TECHNIQUES FOR DEFENDING CLOUD PLATFORMS AGAINST CYBER-ATTACKS

(71) Applicant: RADWARE, LTD., Tel Aviv (IL)

(72) Inventors: Amnon Lotem, Ramot Hashavim (IL); Nissim Pariente, Kiryat Ono (IL)

(73) Assignee: Radware Ltd., Tel Aviv (IL)

( * ) Notice: Subject to any disclaimer, the term of this patent is extended or adjusted under 35 U.S.C. 154(b) by 356 days.

(21) Appl. No.: 16/237,259

(22) Filed: Dec. 31, 2018

(65) Prior Publication Data

US 2020/0213338 A1 Jul. 2, 2020

(51) Int. Cl.
*H04L 29/06* (2006.01)
*G06N 20/00* (2019.01)

(52) U.S. Cl.
CPC ......... *H04L 63/1425* (2013.01); *G06N 20/00* (2019.01); *H04L 63/1441* (2013.01)

(58) Field of Classification Search
None
See application file for complete search history.

(56) References Cited

U.S. PATENT DOCUMENTS

| | | | |
|---|---|---|---|
| 8,468,602 B2 * | 6/2013 | McDougal | G06F 21/562 726/23 |
| 9,516,053 B1 * | 12/2016 | Muddu | H04L 63/1433 |
| 10,581,888 B1 * | 3/2020 | Agranonik | H04L 63/1466 |
| 10,666,666 B1 * | 5/2020 | Saurabh | H04L 63/1425 |
| 10,673,880 B1 * | 6/2020 | Pratt | H04L 63/1425 |
| 10,735,272 B1 * | 8/2020 | Saurabh | H04L 63/1425 |
| 10,762,206 B2 * | 9/2020 | Titonis | G06F 21/56 |
| 2015/0295808 A1 * | 10/2015 | O'Malley | H04L 47/22 709/224 |
| 2017/0214708 A1 * | 7/2017 | Gukal | G06F 16/285 |
| 2018/0027006 A1 * | 1/2018 | Zimmermann | H04L 63/0245 726/11 |
| 2018/0167402 A1 * | 6/2018 | Scheidler | G06F 21/554 |

OTHER PUBLICATIONS

Medhat, May et al. A New Static-based Framework fro Ransomware Detection. 2018 IEEE DASC/PiCom/DataCom/CyberSciTech. https://ieeexplore.ieee.org/stamp/stamp.jsp?tp=&arnumber=8511967 (Year: 2018).*

Xiong, Jinbo et al. MAIM: A Novel Incentive Mechanism Based on Multi-Attribute User Selection in Mobile Crowdsensing. IEEE Access, vol. 6. https://ieeexplore.ieee.org/stamp/stamp.jsp?tp=&arnumber=8528409 (Year: 2018).*

* cited by examiner

*Primary Examiner* — Jeremiah L Avery
(74) *Attorney, Agent, or Firm* — M&B IP Analysts, LLC (57) ABSTRACT

A method and system for protecting a cloud computing platform against cyber-attacks are provided. The method includes gathering cloud logs from a cloud computing platform; analyzing, by a plurality of detectors, the cloud logs to detect at least one suspicious behavior, wherein each of the at least one suspicious behavior is identified by a suspect indicator; sequencing suspect indicators into attack sequences; scoring each of the attack sequences with an attack score, wherein each attack is scored using a scoring model; and alerting on each attack sequence having a score higher than a predefined threshold.

34 Claims, 6 Drawing Sheets

TECHNIQUES FOR DEFENDING CLOUD PLATFORMS AGAINST CYBER-ATTACKS

TECHNICAL FIELD

This disclosure relates generally to cyber-security systems and, more specifically, to techniques for the detection of cyber-attacks against cloud platforms.

BACKGROUND

With the increasing use of computers in modern society, computer systems have become increasingly subject to cyber-attacks intended to disrupt systems, steal data, cause application defacement, manipulate behavior, or a combination of these goals. Accordingly, the field of cyber security has developed to combat such cyber-attacks. Cyber security is particularly important in cloud computing platforms, where multiple computer resources interact remotely in order to provide services, e.g., sharing of files and applications. Organizations have increasingly adapted their applications to be run from cloud computing platforms.

Some leading public cloud service providers include: Amazon®, Microsoft®, Google®, Oracle®, Hewlett-Packard®, and so on. To ensure their services are not interrupted, these service providers must protect their customers against cyber security threats. In most cases, providers offer solutions to protect their infrastructure against cyber-attacks.

As more organizations migrate to the cloud, attackers have begun targeting cloud computing platforms and applications hosted therein more frequently, as evidenced by an increasing number of attacks directed to cloud computing assets. Further, to carry out more advanced attacks, attackers have begun combining multiple cyber security threat techniques into a single attack, thereby increasing the likelihood of bypassing defenses. Moreover, cyber security requirements are becoming even more rigorous as attacks become more sophisticated, more vicious, longer lasting, and occur in higher volumes and velocity.

Further, public clouds providing Infrastructure as a Service (IaaS) are very dynamic in nature. That is, IaaS typically provides a large set of virtual machines and containers that are invoked upon demand, and a large set of services and serverless computations that are offered by cloud providers. Thus, such environment and infrastructure is vulnerable for new and evolving cyber-attacks. In addition, the public cloud infrastructure imposes new challenges for security teams of organizations that use such infrastructure. Such challenges include closely monitoring the cloud activity to effectively and efficiently detect attack breaches.

It would therefore be advantageous to provide a solution for defending cloud computing platforms.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for method for protecting a cloud computing platform against cyber-attacks. The method comprises gathering cloud logs from a cloud computing platform; analyzing, by a plurality of detectors, the cloud logs to detect at least one suspicious behavior, wherein each of the at least one suspicious behavior is identified by a suspect indicator; sequencing suspect indicators into attack sequences; scoring each of the attack sequences with an attack score, wherein each attack is scored using a scoring model; and alerting on each attack sequence having a score higher than a predefined threshold.

Certain embodiments disclosed herein also include a system for cloud computing platform against cyber-attacks. The system comprises a processing system; and a memory, the memory containing instructions that, when executed by the processing system, configure the system to: gather cloud logs from a cloud computing platform; analyze, by a plurality of detectors, the cloud logs to detect at least one suspicious behavior, wherein each of the at least one suspicious behavior is identified by a suspect indicator; sequence suspect indicators into attack sequences; score each of the attack sequences with an attack score, wherein each attack is scored using a scoring model; and alert on each attack sequence having a score higher than a predefined threshold.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Figure 1:
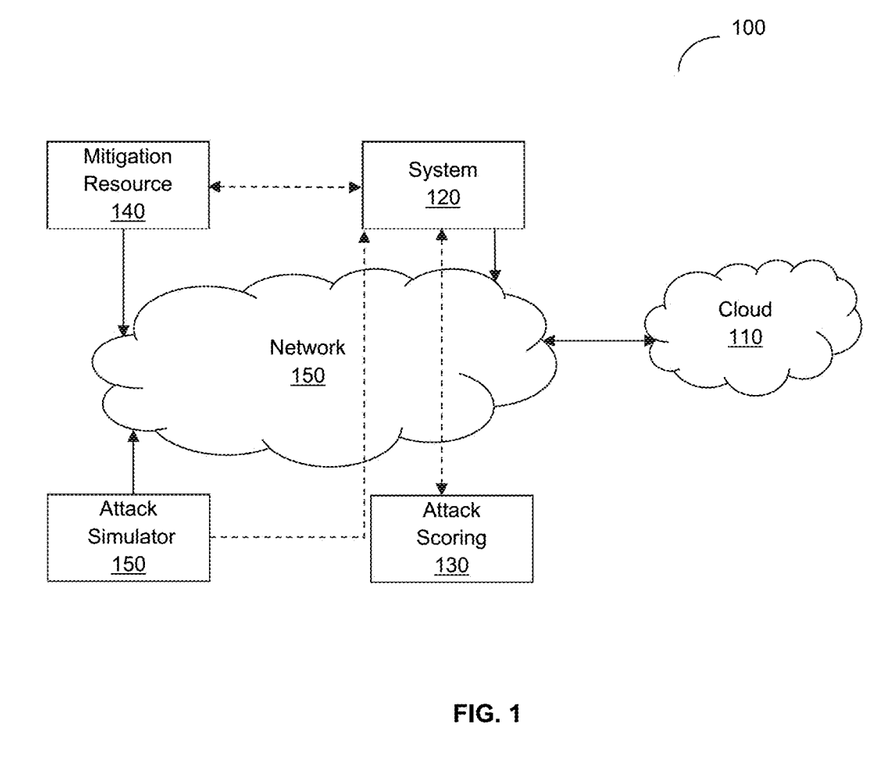
FIG. 1 is a network diagram utilized to describe the various disclosed embodiments.

FIG. 1 is an example network diagram 100 utilized to describe the various disclosed embodiments. The network diagram 100 demonstrates at least one cloud computing platform 110, a security system (hereinafter "the system"

120), an attack scoring engine 130, a mitigation resource 140, and an attack simulator 150. In one configuration, all elements demonstrated in FIG. 1 are connected through a network 150. In another configuration, some or all of the elements shown in FIG. 1 are part of the cloud computing platform 110. The network 150 may be, for example, the Internet.

The cloud computing platform 110 may be, but is not limited to, a public cloud, a private cloud, or a hybrid cloud. Example cloud computing platforms include Amazon® Web Services (AWS), Cisco® Metacloud, Microsoft®, Azure®, Google® Cloud Platform, HP® Cloud, and/or the like. In an embodiment, the cloud computing platform may serve as infrastructure-as-a-service (IaaS), Platform-as-a-Service (PaaS), Function as a Service (FaaS), or a combination thereof.

The cloud computing platform 110 may execute web or cloud applications, cloud services, serverless functions, and the like. Execution of such applications, services, or functions is over a virtual entity. The virtual entity may include, for example: a virtual machine, a software container, or any virtual environment for executing codes or applications.

The system 120 is configured to detect and alert cyber-attacks performed within and/or against resources of the cloud-computing platform 110, for example, attacks against applications, services, or functions executed in the platform 110 and/or attacks against infrastructure on of the cloud computing platform 110. In an example embodiment, the system 120 is configured to defend against various types of cyberattacks.

The attack scoring engine 130 is configured to generate a scoring model utilized by the system 120 to detect attacks and prioritize alerts. The scoring engine 130 and the scoring model are discussed in more detail below.

The mitigation resource 140 is configured to perform one or more mitigation actions on the traffic directed to or from the cloud computing platform. The mitigation action may include reporting alerts to the cloud operator and/or administrator. In other embodiment, when protecting against DDoS attack, the mitigation action may include a scrubbing operation, blocking traffic, and so on, or any combination thereof. In some embodiments, the mitigation resource 140 may be, but is not limited to, an "on the cloud" scrubbing center. In another embodiment, the mitigation resource 140 is a multi-tiered mitigation system. An arrangement, configuration and orchestration of a multi-tiered mitigation system is disclosed in U.S. patent application Ser. No. 14/640,814, assigned to the common assignee, which is hereby incorporated by reference.

The attack simulator 150 is configured to generate 'demy' attacks to train the scoring model. The simulator 150 is further configured to evaluate and tune the system 120. Specifically, the attack simulator 150 can employ a number of techniques for generating the attacks. In an embodiment, the attack simulator 150 is configured to perform actual attacks on the public cloud environment using bots. The attack is performed during a predefined time window. The logs of the cloud computing platform 110 record such activities. The logs are later collected by the system 120.

In yet another embodiment, log records representing attacks (or suspicious behavior) are generated synthetically for a cloud environment and "injected" into the detection system as they come from real logs of the cloud environment. In an embodiment, this can be performed in two steps. In the first steps, attack scenarios are produced manually. Such an attack scenario includes a list of attack steps to be performed. In the second step, the attack steps produce synthetic log records, which relate to specified cloud entities in the cloud computing platform. For example, an attack step which scans the network, produces communication log records relating to a specified source IP address in the cloud and range of network destination addresses and ports. These log records are injected to the system 120 as they are real logs gathered from the cloud computing platform 110.

In yet another embodiment, the attack scenarios are automatically generated by a simulator 150 using some knowledge representation about attack steps, their preconditions and effects. The simulator 150 is configured to combine the attack steps to achieve some goals or to obey to some high-level attack structure. Alternatively, the simulator 150 can use a relatively small set of attack examples, and generate variations and permutations of them. In yet an embodiment, the attack simulator 150 can generate attack sequences by transforming the generated attack scenarios into suspect indicators and activities.

The system 120 is configured to process the logs created due to activity of the simulator 150 in order to generate attack sequences and label them as such. As discussed later, the labeled sequences can be utilized to generate the scoring model.

According to the disclosed embodiments, the system 120 is configured to collect data that would assist in detection of cyber-attacks. In an embodiment, the data is collected from the cloud computing platform 110 and typically includes events related to activity performed in the cloud computing platform 110, access logs, and configuration files related to the cloud environment and configuration. The system 120 is further configured to normalize the collected data. Further, the system 120 may enrich the normalized data with contextual information to result in an enriched data set.

The system 120 is configured to process the enriched data set to identify suspicious activities. Specifically, as will be disclosed below, the process is performed using a plurality of detectors that generate suspect indicators resulting in an indication of suspicious behaviors. In an embodiment, a suspect indicator, by its own, is usually not sufficient evidence for an attack, but a combination of suspect indicators may serve as such. In an embodiment, the system 120 is configured to process the suspect indicators into sequences. A sequence is a set of potentially related activities in the cloud computing platform 110 that were found to be suspicious.

According to an embodiment, the system 120 is configured to score the sequence using a scoring model generated by the scoring engine 130. Each sequence with a score over a predefined threshold is reported as an alert. The system 120 is further configured to report the alert with information on the identified suspected activities. In an embodiment, the system 120 is further configured to instruct the mitigation resource 140 to perform one or more mitigation action, upon detection of an attack.

The attack scoring engine 130 is configured to process data from different sources (not shown in FIG. 1) to generate the scoring model. The scoring model allows a score to be determined for each generated sequence. Such data sources include repository of historic information on suspect indicators, repository of historic determined sequences labeled as attacks, and reputation repository characterizing the risk and reputation of entities in the cloud computing platform. The entities include hosts, users, resources, and the like. The data sources may be part of the attack scoring engine 130 or a third-party source (or service). The embodiments for generating the scoring model and computing a score are disclosed below.

It should be noted that the example implementation shown in FIG. 1 is described with respect to a single cloud computing platform 110 merely for simplicity purposes and without limitation on the disclosed embodiments. More or fewer cloud computing platforms, may be protected without departing from the scope of the disclosure. It should be further noted that the disclosed embodiments can operate in multiple-cloud architectures including only two cloud computing platforms or a cloud computing platform and a datacenter.

Further, the attack scoring engine 130, the attack simulator 150, and the system 120 may be hosted on the computing platform or integrated in a single system. Further, the mitigation resource may be part of the cloud computing platform.

Figure 2:
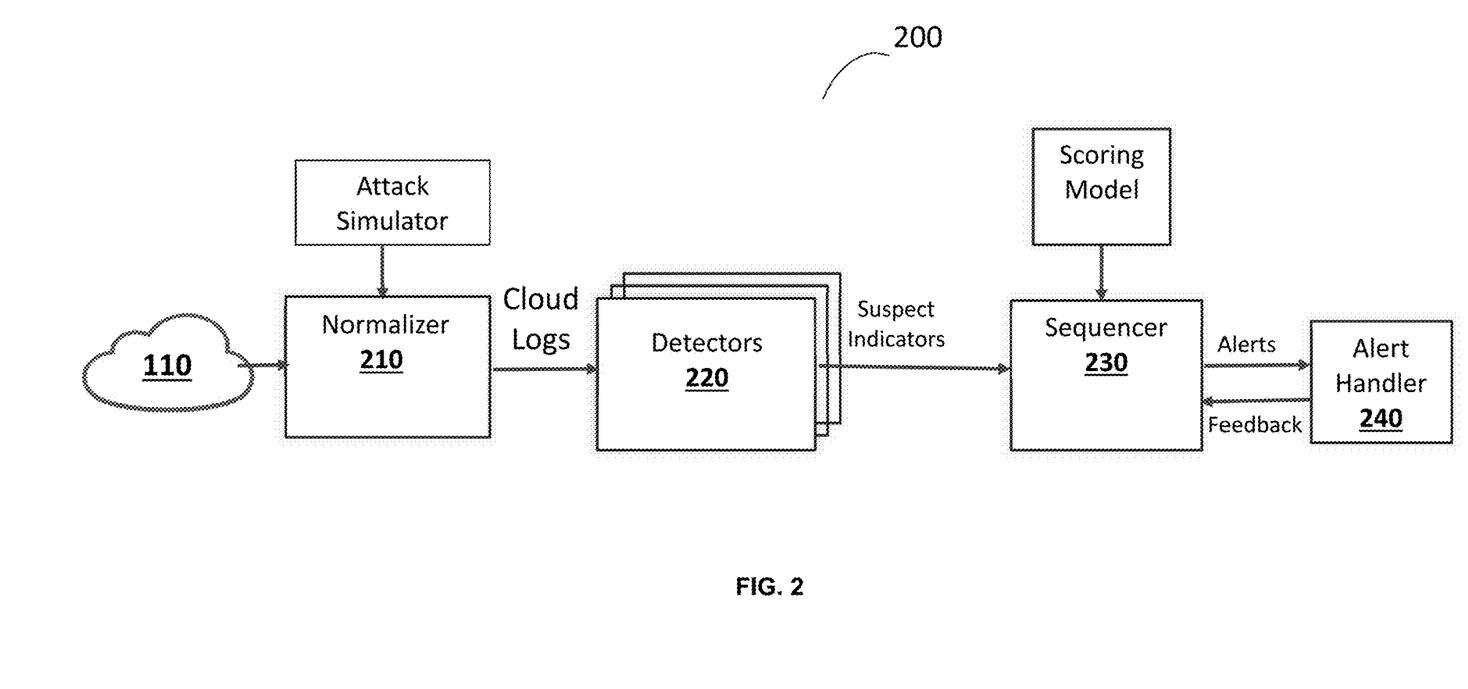
FIG. 2 is a diagram utilized to describe the operation of the system according to an embodiment.

FIG. 2 shows an example diagram 200 utilized to describe the operation of the system 120 according to an embodiment.

The system 120 includes a normalizer 210, a plurality of detectors (collectively shown as detectors 220), a sequencer 230, and an alert handler 240. The normalizer 210 is configured to gather data provided by the cloud computing platform 110 (FIG. 1). The gathered data includes, at least, activity events and access logs. As an example, the gathered data may include any communication to and from the cloud computing platform, usage of cloud services (e.g., calls to APIs of cloud services), access to cloud resources or services (e.g., storage), activity of virtual entities (e.g., VMs or containers), the OS activity (e.g., invoked processes, logon events), DNS queries, load balancers activity, a web application access, a DB access, software deployment actions, and more. The collected information may further include snapshots of the cloud's configuration.

The collected information is normalized. That is, the normalizer 210 is configured to transform the collected data into a standard format. The format is required so that information collected from, for example, different cloud computing platforms or different cloud entities, will be processed in the same manner by the system 120.

In an embodiment, the normalizer 210 is further configured to enrich the normalized information by adding contextual data. The contextual information can be gathered from multiple external sources or services (not shown in FIG. 2). In an example implementation, the contextual data may include, but is not limited to, Flow data (e.g., NetFlow data), Border Gateway Patrol (BGP) data, Simple Network Management Protocol (SNMP) data, data from Remote Authentication Dial-In User Services (RADIUS), Policy and Charging Rules Function (PCRF) data, active domain name service (DNS) queries, DNSFlow, logs, data from Internet sources such as WHOIS, data from FarSight DNSDB, data from Layer 7 entities (e.g., FW, ADCs, DPIs, etc.), contextual, Geo information from MaxMind, and the like. For brevity of the discussion, the normalized and enriched information will be referred to as "cloud logs".

The cloud logs are processed by one or more detectors 220. Each detector 220 is configured to handle a different type of suspicious behavior. Further, each detector 220 may implement a different analysis technique to process the cloud logs. For example, one detector may be configured to identify anomalous volumes of communication traffic from public cloud hosts to external addresses. Another detector may be configured to identify unusually cloud access to a storage service, and the like.

In an embodiment, a detector 220 may be programmed to match the cloud logs to threat intelligence information. Such information is provided by external sources (not shown in FIG. 2). In another embodiment, the detector 220 may be programmed using a set of rules to identify suspicious behavior. The set of rules may include, for example, a security policy defined for a resource of the cloud computing platform. In yet another embodiment, a detector 220 is programmed to implement a machine learning technique to establish a normal behavior and identify deviation from the normal behavior. In an example embodiment, the machine learning technique may include deep neural networks.

It should be noted that at each processing cycle, a subset of detectors 220 may be utilized. Each of the detectors 220 is configured to generate suspect indicator (SI) on information related to suspicious behavior performed by a cloud entity at certain time or a time range. As noted above, a cloud entity may include a user, a host, a source or destination IP address, a container, a process which runs on a host or container, a serverless function, and the like.

It should be noted that a suspect indicator may not be sufficient by its own to point on a potential cyber-attack. As such, all indicators generated by the various detectors 220 are processed by the sequencer 230.

In an embodiment, the sequencer 230 is configured to generate attack sequences and scoring the generated sequences. In an embodiment, the sequencer 230 is configured to group the suspect indicators, representing similar suspicious behavior of at least one cloud entity, into an activity record. An activity record provides information on the performed activity, a time period, and a reference to the suspect indicators that made it suspicious. For example, all suspect indicators related to communication between the same hosts are grouped. As another example, suspect indicators related to access of a specific cloud entity are grouped. As yet another example, suspect indicators related to invocation of same process on a virtual machine are grouped.

It should be noted that grouping of suspect indicators into activity records may be performed based on any combination of a common cloud entity, activity type, and time proximity of suspect indicators. It should be further noted that sequencing of suspect indicators allow reducing the number of false alarms. Typically, an attack is composed of a sequence of actions that each action by itself may be legitimate or malicious. For example, a public cloud data breach typically includes several 'kill-chain' steps, such as reconnaissance, scanning, persistency, lateral movement, data acquisition and data exfiltration. Sequencing the indicators (related to certain activity) may yield to a composed chain of attack.

In an embodiment, the sequencer 230 is configured to select a first activity (from the set of activities generated by grouping of suspect indicators) that is not associated with a sequence yet, and then search for another (second) activity (from a second set of activities) that matches the first activity. The matching activities should have common entities occurred in the same time proximity. If the selected activity is already associated with a sequence, the first activity is associated with that sequence. Otherwise, a new sequence is generated and the first and second activities are associated with the newly created sequence. The matching may be based on predefined criteria for activities defined in an activity and/or based on certain operations defined in an activity.

Figure 3:
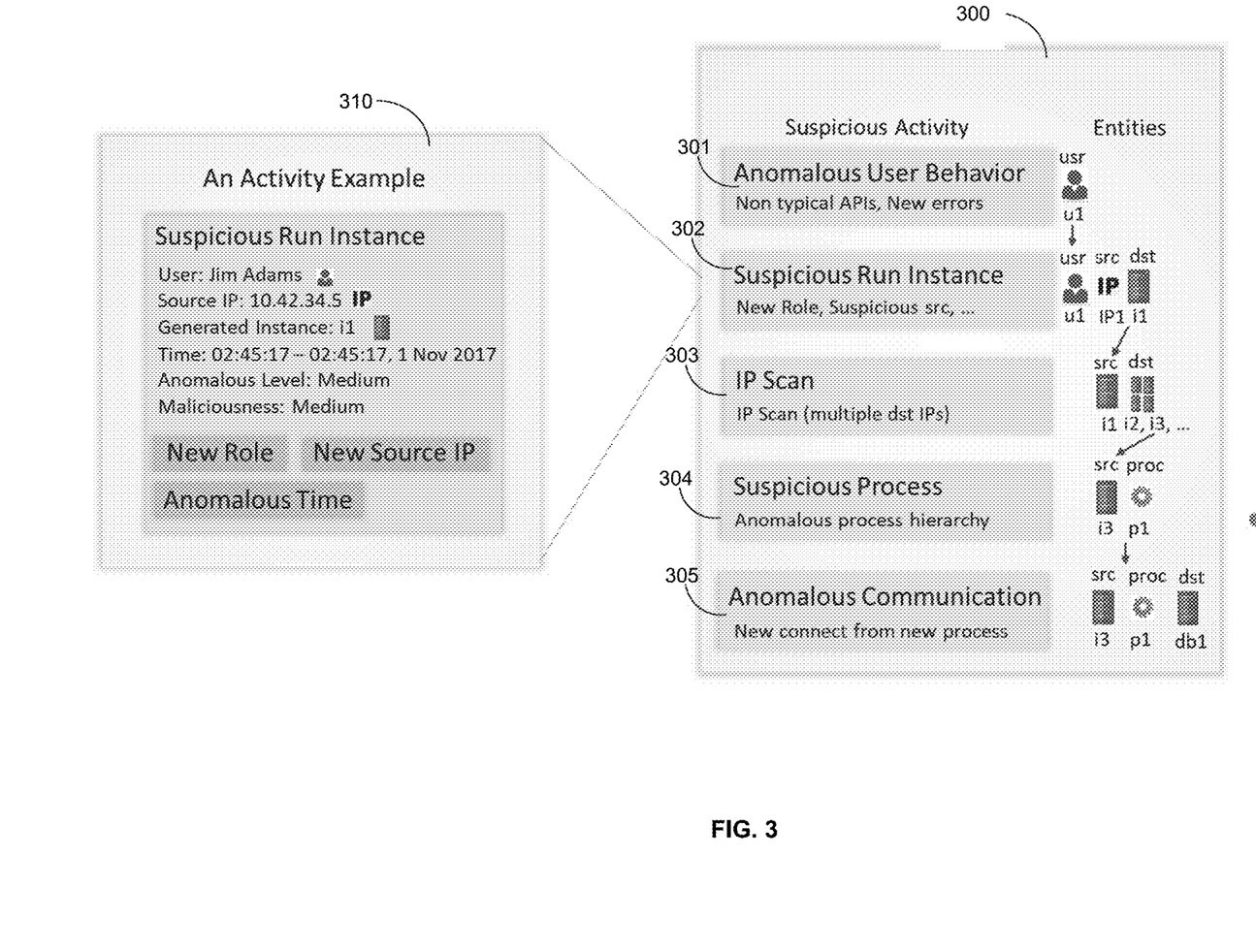
FIG. 3 demonstrates the operation of a sequencer according to an embodiment.

FIG. 3 further demonstrates the operation of the sequencer 230 according to an embodiment.

The first activity (labeled as 301) in a sequence 300, relates to a suspicious usage of cloud services by a user having a user ID 'u1' (identified as Jim Adams). The user performs several API calls, of which resulted in two suspect indicators: non-typical API for the user 'u1' and new types of errors encountered when the user attempted to access these APIs. The first suspect indicator (non-typical API) is detected based on learning the typical API usage of the user 'u1'. The second suspect indicator is resulted from permission issues.

Minutes after the detection of the first and second suspect indicators, a new activity (labeled as 302) is detected. The details of the new activity is shown in block 310. Here, the user 'u1' invokes a new instance of (labeled as 'i1'). The activity 302 is detected as suspicious due to three suspect indicators: 1) the role (one of the invocation parameters) was never used by the user 'u1' for invoking virtual machines; 2) the source IP address (10.42.34.5) from which the user 'u1' performed the action was unknown for the user (based on a baseline collected over time); 3) and the time in which the operation was performed (02:45) is anomalous for the user.

The activity 310 is associated with the sequence 300 based on common entity 301, a common entity, a user 'u1' users, and time proximity.

After about 15 minutes since the invocation of the new virtual machine 'i1', a network scanning activity (labeled as 303) is detected. Such activity includes sending, by the virtual machine, communication packets to several hosts in the cloud network (i2, i3, . . . ). The activity 303 is also associated with the sequence 300 as, the host name 'i1' ran the network (IP) scan activity which occurred in time proximity to activity 303.

Several minutes after the network scanning activity 303, one of the scanned hosts, 'i3', invokes a suspicious process, and an activity (labeled as 304) is detected. The suspect indicator of that activity 304 relates to the fact that the process (p1) was invoked by a non-typical parent process (anomalous process hierarchy). The association of an activity 304 with the sequence 300 is due to the common host i3' of which appeared in the scanning activity 303 (as a destination).

An anomalous process 'p1' executed by the host 'i3' is detected as a suspicious process activity (labeled as activity 305). The process 'p1' initiates anomalous communication to a database. As a result, a suspicious anomalous communication activity (labeled as 306) is detected. The suspect indicator of that activity (new connect from new process) is triggered since there are no past connections from the process 'p1' to the database.

The activities 305 and 306 are associated with the sequence 300 since the process ID ('p1') and the hostname ('i3') appeared in both the suspicious process activity and the anomalous communication activity both occurring in relatively close proximity of time. It should be noted that the sequences are built incrementally. That is, as new suspicious activities are detected, existing sequences may be updated, or a new sequence may be created.

Returning to FIG. 2, as noted above, all sequences are scored using the scoring model. A sequence having a risk score over a predefined threshold is reported as an alert by the alert handler 240. In an embodiment, the alert hander 240 is configured to prioritize alerts based on the score associated with each sequence and determine which alert requires handling. It should be noted that an alert represents a sequence found to be suspicious or risky.

The alert hander 240 is further configured to filter the alerts based on, for example: entities involved in the sequences, a type of the suspicious behavior, a score of sequence, and the sequence indicators. In an embodiment, each alert may be reported with a set of recommendations on how to handle the alert.

It should be noted that the alerts may be displayed over a user interface with a timeline presenting the activities and the suspect indicators of each activity. The alerts may be reported through an API, and the like.

The elements of the system 120, depicted in FIG. 2, can be implemented using any combination of software, firmware, and hardware logic components and circuits. For example, and without limitation, illustrative types of hardware logic components that can be used include: field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

Figure 4:
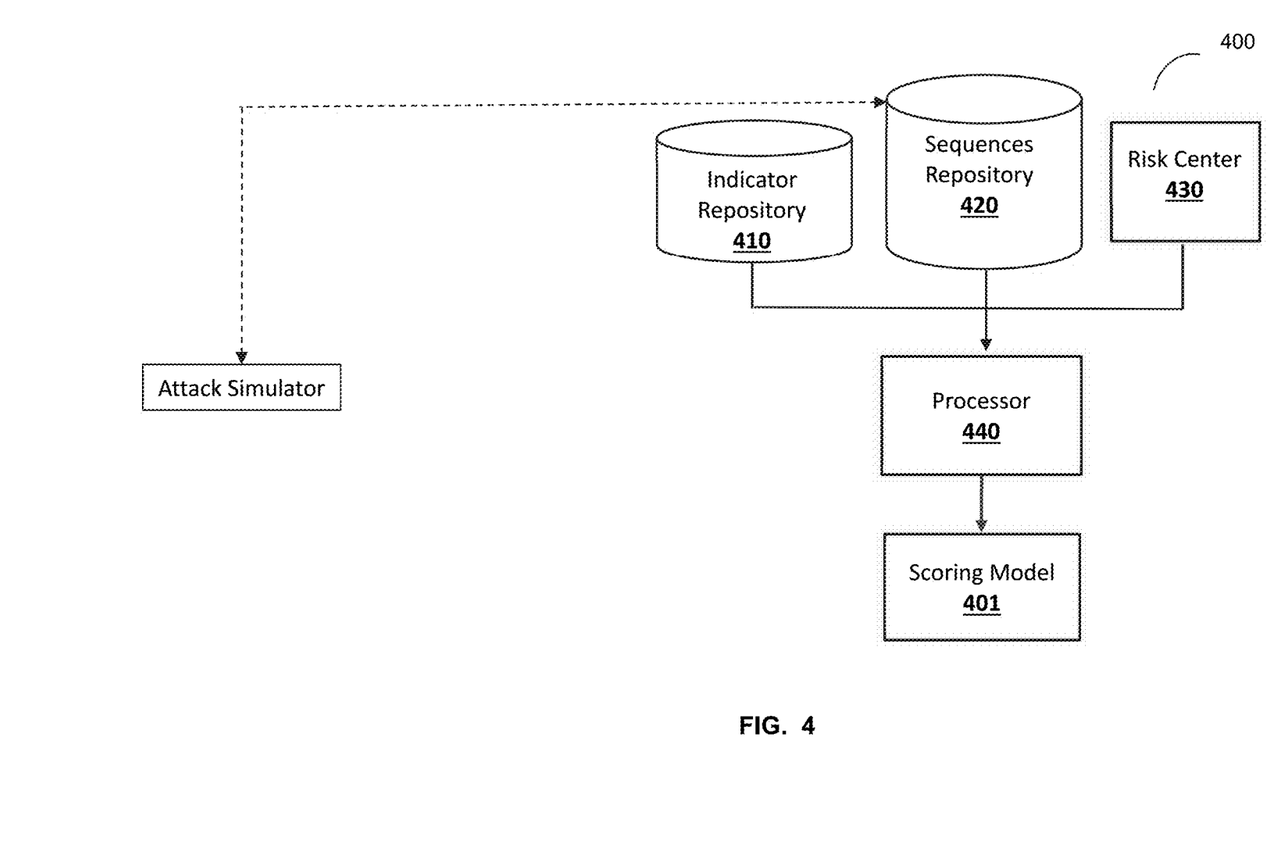
FIG. 4 is a diagram illustrating the operation of the attack scoring engine according to an embodiment.

FIG. 4 is an example diagram 400 illustrating the operation of the attack scoring engine 130 according to an embodiment. The attack scoring engine 130 includes a SI repository 410, a sequences repository 420, a risk center 430, and a processor 440. The scoring engine 130 is configured to create or update a scoring model 401. The scoring model 401 is configured to determine a score for each sequence. A higher score indicates a suspicious and risky sequence. The generated score may be composed of various sub-scores and indications, each of which can explain the score or can assist in prioritizing alerts.

In an embodiment, the score may be determined based, in part, on a risk score of a sequence. The risk score determines to what extent sensitive cloud entities and actions are involved in the sequence. For example, the sequence may involve receiving files from a sensitive folder of the cloud storage service. Such activity imposes a higher risk score than the case where the folder does not sensitize contents.

The risk score is determined based on the sensitivity of the involved cloud entities. The information of the cloud entities are retrieved from the risk center 430. The risk score may be a level-based (e.g., low, medium, or high) or a numeric value. The computation may be performed using a set of predefined rules (e.g., sensitive entity and risky action implies high risk), or using a machine learning algorithm that learns from a set of examples with a risk score that was assigned by a user.

The generated score may be based on a likelihood score, a maliciousness score, or any combination of the likelihood, maliciousness, and/or risk scores. The combined score may be generated based on a weighted function or using a supervised machine learning algorithm.

As noted above, the SI repository 410 is a repository that maintains suspect indicators (SI) previously generated by the system 120. The sequences repository 420 maintains sequences previously generated by the system 120 and sequences generated by the attack simulator 150. The sequences that relate to an attack are labeled accordingly.

The risk center 430 is configured to provide information on the risk of cloud entities based on information on such entities. Specifically, the risk center 430 is configured to gain and extract information about the sensitivity of cloud entities and their potential risk.

This is performed since the entities in the public cloud of an organization are not equal in terms of sensitivity and risk. For example, certain folders in the storage services include sensitive personal information, while other folders do not. There are power users that have high privileges in the public cloud, and a theft of their credentials may be very severe. Also, some services and actions available through the Public Cloud APIs (e.g., access management) can cause a severe damage when they are used maliciously. Thus, considering that knowledge is essential for scoring the sequences.

In an embodiment, the risk center 430 may continuously receive contextual information on the public cloud hosts, users, and resources; privileges and access policies, logs about the activity of entities; feeds on the end users regarding risk points related to the cloud. The risk center 430 is configured to perform automatic analysis of the gathered data to determine the potential sensitivity or risk of entities and actions.

For example, the risk center 430 may determine who are the "power" cloud users from privilege policies and from the type of actions performed. The risk center 430 may further sensitize resources (e.g., databases, hosts, etc.) based on executed processes or communication with the host. The risk information maintained by the risk center 430 can be retrieved by other components in the system 120 when needed.

The scoring model 401, when generated, enables to determine the score of each sequence. In an embodiment, the scoring model 401 is configured to consider and combine several scoring factors. Such factors include the likelihood of sequence (or its activities); the maliciousness sentiment of a sequence; and the risk of cloud entities. In general, a combination of low likelihood, high malicious sentiment, and entities with high risk, are expected to yield a high score for the sequence.

The processor 440 is configured to process the information maintained in the repositories 410 and 420 as well as the risk center 430 in order to generate the scoring model 401. In an embodiment, the processor 440 utilizes Bayesian models for computing the likelihood of suspect indicators appearing in the sequence. In an embodiment, the suspect indicators resided in the indicators repository 410 serve as the historic data for such processing. In an embodiment, the processor 410 is configured to determine the likelihood of a suspect indicator type to occur on a specified entity.

For example, referring to FIG. 3, the likelihood of anomalous time to occur for user 'u1'. There may be users for which anomalous time is quite common (e.g., every week), while for other users such an event never happened or is very rare. In another embodiment, the computation considers the rate of cases in which the entity had the suspect indicator, and the activity level of the entity.

More granular computation can be done, relating to some context or parameter of the suspect indicator, such as anomalous active time when performing run instance. It should be noted that when not enough data exist, lower granularity computation can be performed. As an example: the likelihood of the suspect indicator type to occur, for a reference group of the entity (e.g., a user group which the user relates to).

It should be further noted that a Bayesian graph or a simplified version of the graph can be used to compute the likelihood of an activity record based on the likelihood of its suspect indicators. That computation requires the understanding of whether or not the suspect indicators of the activity record, can be considered as independent or not. This could be estimated using correlation checks between pairs of suspect indicator types.

In an embodiment, the Bayesian graph, or a simplified version of such a graph, can also be used to estimate the likelihood of the sequence based on the likelihood computed for the activities of the sequence.

In another embodiment, the processor 440 is configured to compute the maliciousness sentiment of a sequence. The maliciousness sentiment determines if a sequence represents a set of actions that may be performed by an attacker. In an embodiment, the sentiment can be computed using a weighted function of the scores computed for the SI within a sequence. In another embodiment, the sentiment can be computed using a supervised machine learning model trained over a labeled set of sequences. The labels may be of a malicious sequence of or a legitimate sequence.

The labeled sequences may be retrieved from the repository 420. It should be noted that typically there are more legitimate sequences than malicious (attacks) sequences, since attacks are relatively rare. In order to increase the set of labeled malicious (attacks) sequences, the attack simulator (150, FIG. 1) is utilized to produce attack sequences.

It should be noted that the labeling of sequences may be binary (malicious or legitimate). The labels may include some additional information, such as suspicious levels, e.g., low, medium, and high. The labels can also be transformed to a numeric score, such as 0, 0.2, 0.4, 0.6, 0.8, 1.0, respectively.

In an embodiment, the labels for simulated attack sequences can be set by the attack simulator according to the intent of the simulation. In some embodiments, the labels can be associated with sequences by a user. It should be noted that various alternative methods can be used for the supervised machine learning techniques. Such techniques may include recurrent neural networks, such as long short-term memory networks (LSTM), convolutional neural networks (CNN), and the like.

Applying neural network techniques to sub-sequences of the input sequences (e.g., using the neural network techniques mentioned above), the sub-sequences can be broken down into contiguous sequences of 'n' items (like n-grams in text mining).

It should be noted that building an underlying graph represents different types of relations (such as "enables" and "coexist") between activities or suspect indicators. Then transforming the graph to a sequential form (e.g., using random walks in the graph), and applying neural networks techniques to the generated sequential forms. The relations of "enables" can be, for example, between an activity that invokes a virtual machine and an activity of running some suspicious process on that virtual machine. The "coexist" relation can be, for example, between suspect indicators of the same activity (e.g., anomalous time and anomalous source IP).

Extracting features from the sequences and applying traditional supervised machine learning techniques or neural network techniques to the extracted features. The features may include, for example, the length of the sequence, the number of distinct suspect indicators of the activities, the distinct suspect indicators, achievements or privileges gains that were potentially achieved by the sequence activities.

In an embodiment, result of the supervised machine learning is the scoring model 401 for the sequence maliciousness. When the model is applied to a new sequence it produces a score that is related to its maliciousness level.

In some embodiments, the techniques disclosed herein can be applied for producing partial scores. That is, scores that relate to certain attack aspect (or phase). For example, identifying and scoring a subset of the activities as a reconnaissance performed by an attacker (learning the environment) or identifying and scoring another subset of activities as exfiltration of data. The scoring may provide insights on the suspected reasons, and can be used also as an intermediate step in determining the score of the whole sequence.

Figure 5:
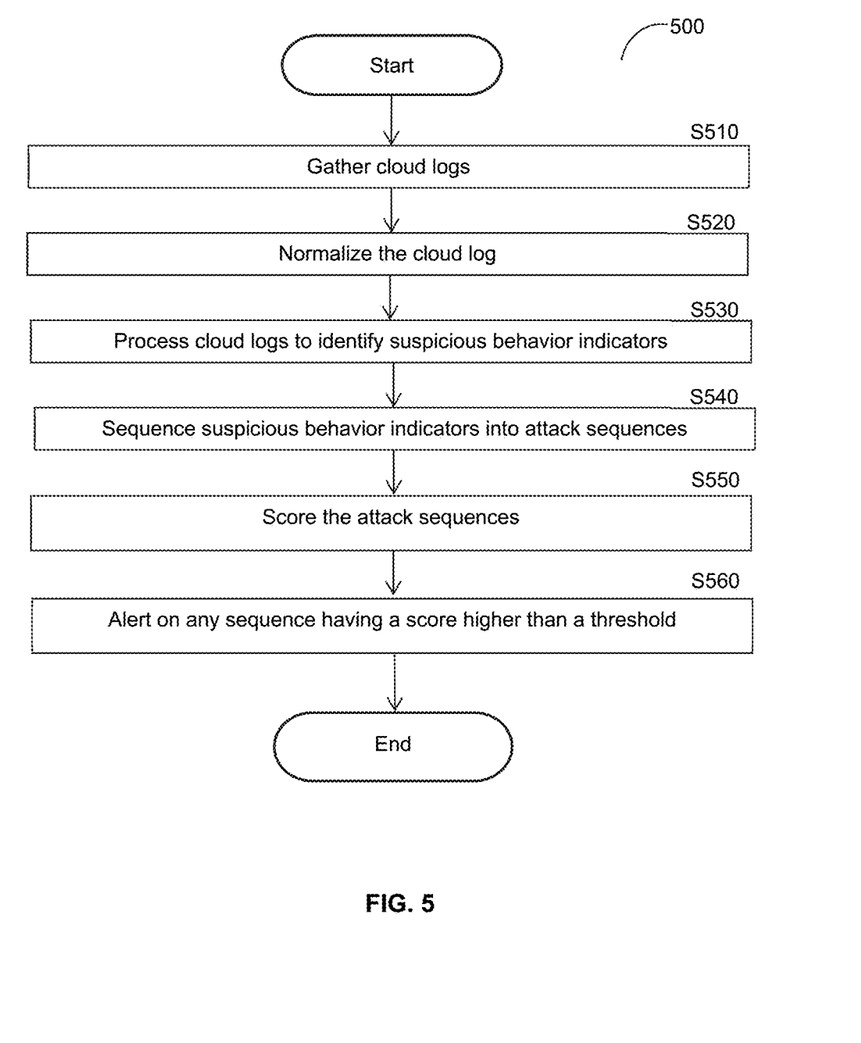
FIG. 5 is a flowchart illustrating a method generating attack sequences and detection of activity based on the sequences according to an embodiment.

FIG. 5 is an example flowchart 500 illustrating a method for protecting cloud computing platforms against cyber-attacks according to some embodiments.

At S510, cloud logs are gathered from the cloud computing platform. Some examples for the contents of cloud logs are provided above. At S520, the gathered cloud logs are normalized into a standard format. In some embodiments, the normalization step is optional.

At S530, the normalized cloud logs are processed by a plurality of detectors to identify suspicious behavior. As noted above, each detector is configured to detect a different type of suspicious behavior and can implement different detection techniques to achieve the detection. Each suspicious behavior is identified by a suspect indicator.

At S540, suspect indicators are sequenced into attack sequences. In an embodiment, S540 includes grouping suspect indicators relating to the same activity or similar activities of at least one cloud entity into an activity record. The activity record provides information on the performed activity, a time period, and a reference to the suspect indicators that made it suspicious. The grouping of suspect indicators into activity records may be performed based on any combination of a common entity, activity type, and time proximity of suspect indicators.

In an embodiment, sequencing of suspect indicators further includes selecting first activity (from the set of activities generated by grouping of suspect indicators) that is not associated with a sequence yet, and searching for another (second) activity that matches the first activity. The matching activities should have common entities occurred in the same time proximity. If the selected activity is already associated with a sequence, the first activity is associated with that sequence. Otherwise, a new sequence is generated and the first and second activity are associated with the newly created sequence. The matching may be based on predefined criteria for activities defined in an SI and/or based on certain operations defined in a SI.

At S550, the generated sequences are scored using the scoring model. The various embodiments for generating the scoring model are discussed above.

At S560, an alert is generated for any attack sequence having a score higher than a predefined value. In an embodiment, S560 further includes causing execution of one or mitigation actions other than reporting the alerts. Such actions may include, for example, quarantining, privilege reduction, a scrubbing operation, blocking traffic, and so on.

Figure 6:
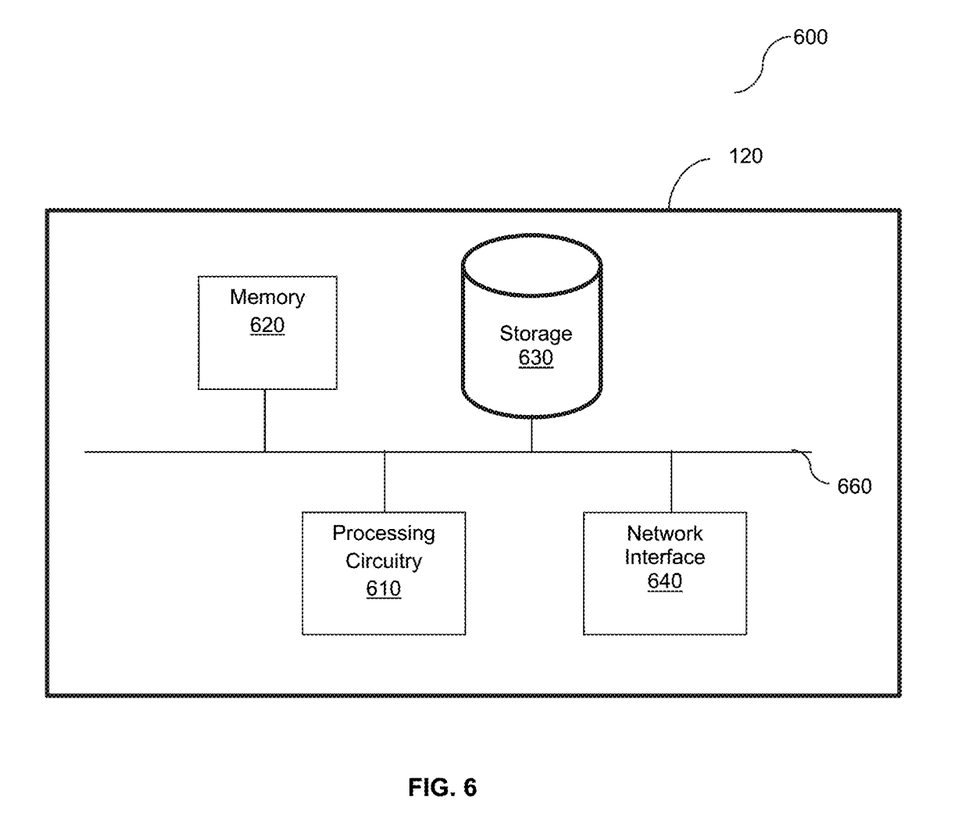
FIG. 6 is a block diagram of the cloud-security system according to an embodiment.

FIG. 6 is an example block diagram of the cyber-security system 120 according to an embodiment. The system 120 includes a processing circuitry 610 coupled to a memory 620, a storage 630, and a network interface 640. In an embodiment, the components of the system 120 may be communicatively connected via a bus 660.

The processing circuitry 610 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 620 may be volatile (e.g., RAM, etc.), non-volatile (e.g., ROM, flash memory, etc.), or a combination thereof. In one configuration, computer readable instructions to implement one or more embodiments disclosed herein may be stored in the storage 630.

In another embodiment, the memory 620 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 610 to perform the various processes described herein. Specifically, the instructions, when executed, cause the processing circuitry 610 to perform out-of-path detection and mitigation of cyber-attacks, including flood DDoS attacks, as discussed hereinabove. In a further embodiment, the memory 620 may further include a memory portion including the instructions.

The storage 630 may be magnetic storage, optical storage, and the like, and may be realized, for example, as flash memory or other memory technology, CD-ROM, Digital Versatile Disks (DVDs), hard-drives, SSD, or any other medium which can be used to store the desired information. The storage 630 may store communication consumption patterns associated with one or more communications devices.

The network interface 640 allows the system 120 to communicate with the monitoring systems in order to receive telemetries and alerts related to traffic behavior. The network interface 640 further allows the system 120 to communicate with the various networks.

It should be understood that the embodiments described herein are not limited to the specific architecture illustrated in FIG. 6, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for protecting a cloud computing platform against cyber-attacks, comprising:
    gathering cloud logs from a cloud computing platform;
    analyzing, by a plurality of detectors, the cloud logs to detect at least one suspicious behavior, wherein each of the at least one suspicious behavior is identified by a suspect indicator;
    sequencing suspect indicators into attack sequences;
    scoring each of the attack sequences with an attack score, wherein each attack is scored using a scoring model; and
    alerting on each attack sequence having a score higher than a predefined threshold.

2. The method of claim 1, further comprising:
    performing a mitigation action to mitigate a cyber-attack represented by each attack sequence having a score higher than a predefined threshold.

3. The method of claim 1, wherein processing the cloud logs further comprises:
    normalizing the cloud logs.

4. The method of claim 1, wherein each of the plurality of detectors is configured to analyze the cloud logs to detect a different type of anomaly.

5. The method of claim 1, wherein analyzing the cloud logs to detect suspicious behavior further comprises:
    matching the cloud logs to threat intelligence information.

6. The method of claim 1, wherein analyzing the cloud logs to detect suspicious behavior further comprises:
    detecting suspicious behavior using a set of preconfigured rules.

7. The method of claim 1, wherein analyzing the cloud logs to detect suspicious behavior further comprises:
    detecting suspicious behavior based on deviation from a normal behavior, wherein the normal behavior is generated based on a machine learning technique.

8. The method of claim 1, wherein the suspicious behavior is of or against a cloud entity.

9. The method of claim 8, wherein sequencing suspect indicators into attack sequences further comprises:
    grouping suspect indicators related to the same suspicious activity into an activity record.

10. The method of claim 9, wherein the activity record includes information on the performed suspicious behaviors, the time period, and a reference to a respective suspect indicator indicative on the suspicious behavior.

11. The method of claim 1, wherein the scoring model is determined based on example attack sequences.

12. The method of claim 11, wherein the historic example attack sequences include historic attack sequences classified as legitimate and simulated attack sequences.

13. The method of claim 11, wherein the scoring model is based on at least one of: a risk score, a likelihood score, and a maliciousness score.

14. The method of claim 13, wherein the risk score relates to a sensitivity of a cloud entity, the likelihood entity defines likelihood of a suspect indicator or the whole sequence to occur in the cloud environment, the maliciousness score determines if a sequence represents a set of actions likely to be performed by an attacker.

15. The method of claim 11, wherein the scoring model is a supervised machine learning scoring model generated based on attack sequence examples.

16. The method of claim 11, wherein the attack sequence examples include labeled historic attacks sequences, wherein the labels may be any one of: malicious and legitimate.

17. The method of claim 11, wherein the attack sequence examples include simulated attacks, generated by an attack simulator.

18. A non-transitory computer readable medium having stored thereon instructions for causing processing circuitry to execute a process for cloud computing platform against cyber-attacks, the process comprising:
    gather cloud logs from a cloud computing platform;
    analyze, by a plurality of detectors, the cloud logs to detect at least one suspicious behavior, wherein each of the at least one suspicious behavior is identified by a suspect indicator;
    sequence suspect indicators into attack sequences;
    score each of the attack sequences with an attack score, wherein each attack is scored using a scoring model; and
    alert on each attack sequence having a score higher than a predefined threshold.

19. A system for cloud computing platform against cyber-attacks, comprising:
    a processing system; and
    a memory, the memory containing instructions that, when executed by the processing system, configure the system to:
    gather cloud logs from a cloud computing platform;
    analyze, by a plurality of detectors, the cloud logs to detect at least one suspicious behavior, wherein each of the at least one suspicious behavior is identified by a suspect indicator;
    sequence suspect indicators into attack sequences;
    score each of the attack sequences with an attack score, wherein each attack is scored using a scoring model; and
    alert on each attack sequence having a score higher than a predefined threshold.

20. The system of claim 19, wherein the system is further configured to:
    perform a mitigation action to mitigate a cyber-attack represented by each attack sequence having a score higher than a predefined threshold.

21. The system of claim 19, wherein the system is further configured to:
    normalize the cloud logs.

22. The system of claim 19, wherein each of the plurality of detectors is configured to analyze the cloud logs to detect a different type of anomaly.

23. The system of claim 19, wherein the system is further configured to:
    match the cloud logs to threat intelligence information.

24. The system of claim 19, wherein the system is further configured to:

detect suspicious behavior using a set of preconfigured rules.

25. The system of claim 19, wherein the system is further configured to:
   detect suspicious behavior based on deviation from a normal behavior, wherein the normal behavior is generated based on a machine learning technique.

26. The system of claim 19, wherein the suspicious behavior is of or against a cloud entity.

27. The system of claim 26, wherein the system is further configured to:
   group suspect indicators related to the same suspicious activity into an activity record.

28. The system of claim 26, wherein the activity record includes information on the performed suspicious behaviors, the time period, and a reference to a respective suspect indicator indicative on the suspicious behavior.

29. The system of claim 26, wherein the scoring model is determined based on example attack sequences.

30. The system of claim 29, wherein the scoring model is based on at least one of: a risk score, a likelihood score, and a maliciousness score.

31. The system of claim 30, wherein the risk score relates to a sensitivity of a cloud entity, the likelihood entity define likelihood of a suspect indicator or the whole sequence to occur in the cloud environment, the maliciousness score determines if a sequence represents a set of actions likely to be performed by an attacker.

32. The system of claim 31, wherein the scoring model is a supervised machine learning scoring model generated based on attack sequence examples.

33. The system of claim 31, wherein the attack sequence examples include labeled historic attacks sequences, wherein the labels may be any one of: malicious and legitimate.

34. The system of claim 31, wherein the attack sequence examples include simulated attacks, generated by an attack simulator.

* * * * *